(12) United States Patent
Brawn et al.

(10) Patent No.: US 7,353,539 B2
(45) Date of Patent: Apr. 1, 2008

(54) SIGNAL LEVEL PROPAGATION MECHANISM FOR DISTRIBUTION OF A PAYLOAD TO VULNERABLE SYSTEMS

(75) Inventors: John Melvin Brawn, San Jose, CA (US); Andrew Patrick Norman, Bristol (GB); Chris Ralph Dalton, Bristol (GB); Jonathan Griffin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 10/345,701

(22) Filed: Jan. 16, 2003

(65) Prior Publication Data

US 2004/0088581 A1 May 6, 2004

(51) Int. Cl.
*G06F 12/14* (2006.01)
*G06F 11/30* (2006.01)
*H04L 9/32* (2006.01)
*G06F 15/173* (2006.01)

(52) U.S. Cl. .......................... 726/25; 726/22; 709/224; 713/187; 713/188

(58) Field of Classification Search ................. 726/25
See application file for complete search history.

(56) References Cited

U.S. PATENT DOCUMENTS

| | | | |
|---|---|---|---|
| 6,647,400 B1* | 11/2003 | Moran | 707/205 |
| 6,704,873 B1* | 3/2004 | Underwood | 726/12 |
| 6,826,697 B1* | 11/2004 | Moran | 726/23 |
| 6,996,843 B1* | 2/2006 | Moran | 726/23 |
| 6,998,208 B2 | 2/2006 | Kiguchi | |
| 7,031,945 B1* | 4/2006 | Donner | 705/64 |
| 7,032,114 B1* | 4/2006 | Moran | 713/187 |
| 7,065,657 B1* | 6/2006 | Moran | 726/5 |
| 2001/0034847 A1 | 10/2001 | Gaul | |
| 2003/0084320 A1 | 5/2003 | Tarquini | |
| 2003/0126472 A1 | 7/2003 | Banzhof | |
| 2004/0088565 A1 | 5/2004 | Norman et al. | |

FOREIGN PATENT DOCUMENTS

WO    WO 01/090892    11/2001

OTHER PUBLICATIONS

Ritchey, Ronald W. Ammann, Paul. "Using Model Checking To Analyze Network Vulnerabilities". IEEE Symposium on Security and Privacy.2000. Relevant pp. 156-165. Found on the World Wide Web at:http://ieeexplore.ieee.org/iel5/6864/18435/00848453.pdf?tp=& amumber=848453&isnumber=18435.*

\* cited by examiner

*Primary Examiner*—Gilberto Barron
*Assistant Examiner*—Jeremiah Avery
(74) *Attorney, Agent, or Firm*—Thomas, Kayden, Horstemeyer & Risley, LLP

(57) ABSTRACT

A method of identifying a software vulnerability in computer systems in a computer network includes a multiple level scanning process controlled from a management system connected to the network. The management system runs a root scanner which applies an interrogation program to remote systems having network addresses in a predefined address range. When a software vulnerability is detected, the interrogation program causes the respective remote system to scan topologically local systems, the remote system itself applying a second interrogation program to the local systems to detect and mitigate the vulnerability using an associated mitigation payload. Whilst that local scanning process is in progress, the root scanner can be applied to remote systems in other predefined address ranges.

23 Claims, 13 Drawing Sheets

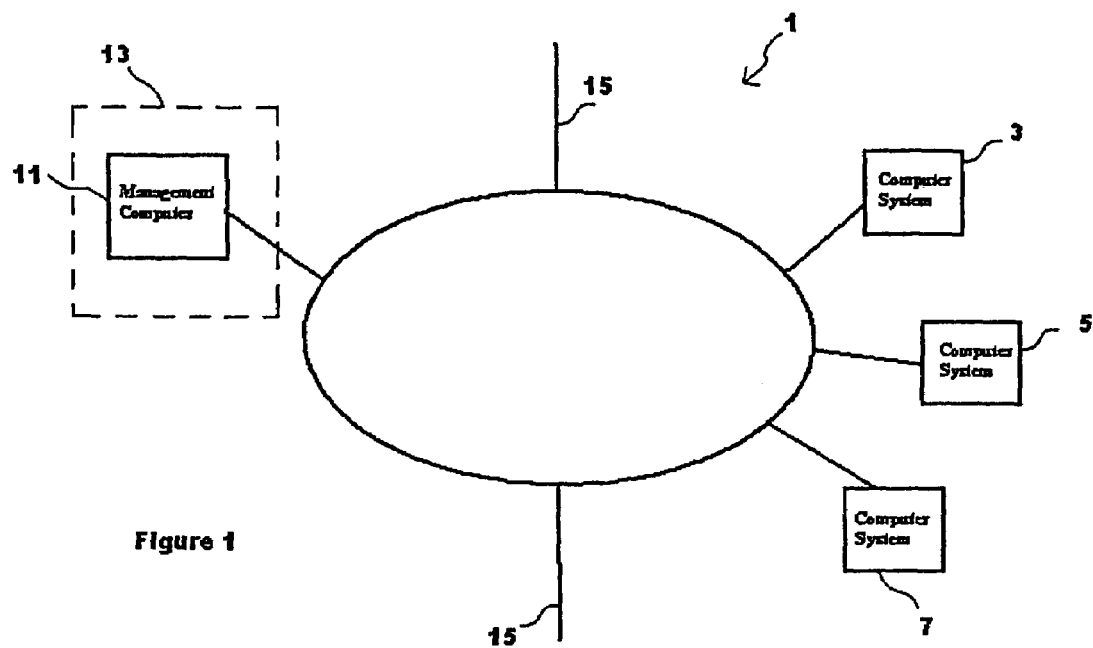
Figure 1
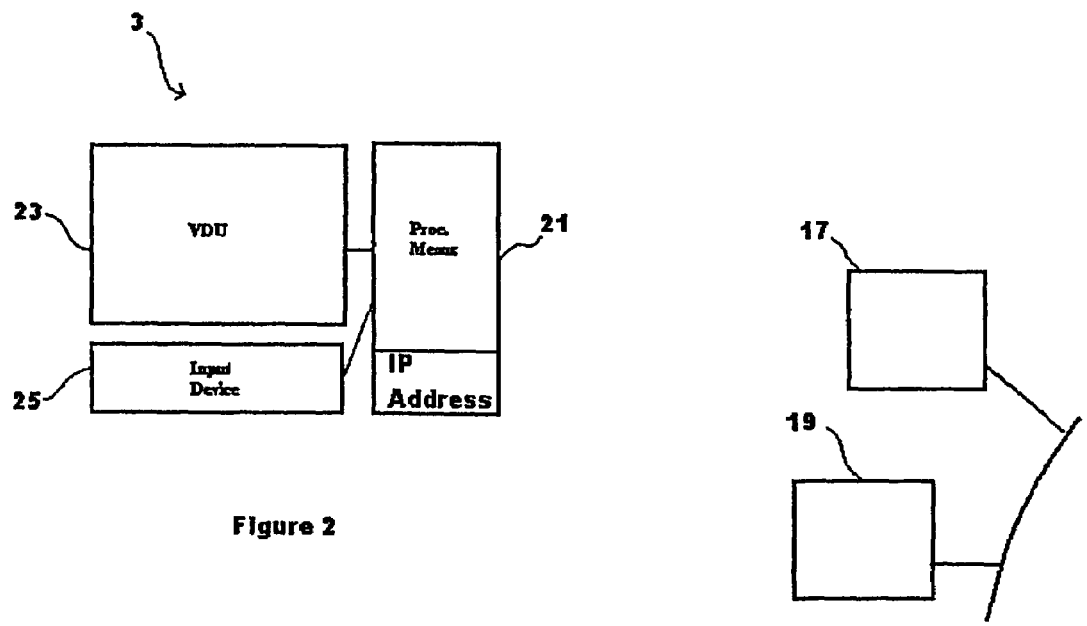
Figure 2
Figure 3

| $V_n$ | Exploit Program |
|---|---|
| $V_1$ | $E_1$ |
| $V_2$ | $E_2$ |
| $V_3$ | $E_3$ |
| $V_4$ | $E_4$ |

29

| Place | Range |
|---|---|
| Location 100 | 15.144.000.000<br>⋮<br>15.144.255.255 |
| Location 200 | 15.125.000.000<br>⋮<br>15.125.255.255 |
| Location 300 | 16.001.000.000<br>⋮<br>16.001.000.255 |
| ⋮ | ⋮ |

Figure 15

SIGNAL LEVEL PROPAGATION MECHANISM FOR DISTRIBUTION OF A PAYLOAD TO VULNERABLE SYSTEMS

SUMMARY OF THE INVENTION

This invention relates to a method of identifying software vulnerabilities in a computer network comprising a plurality of computer systems.

BACKGROUND OF THE INVENTION

Computer networks are used in many types of organisation, for example within business, industrial and educational organisations. A computer network typically comprises a number of computer systems interconnected by data communications links. Computer networks allow data to be shared between users of individual organisations, and also between users of different organisations.

Computer systems connected to such computer networks operate using software executed on the systems. Such software may contain vulnerabilities which render the software, and computer systems running the software, susceptible to interference by unauthorised means. As will be appreciated by those skilled in the art, a software vulnerability may be considered a characteristic of that software which renders it susceptible to processing operations not intended to be permitted or performed by that software. Examples of software vulnerabilities include software features that enable hackers to manipulate the software in an unauthorised way or features that enable malicious mobile code (worms, executable computer viruses, etc.) to access and/or manipulate the software. Knowledge of a software vulnerability enables the formulation of so-called 'exploit' programs which are specifically designed to take advantage of such software vulnerabilities.

Taking a well-known example, in July 2001, a computer virus was discovered that exploited a software vulnerability in a particular web server application. The virus was known as the "Code Red" virus. The virus exploited a stack/buffer overflow vulnerability in the indexing system of the web server application and used a specially designed hypertext transfer protocol (http) request that, when applied to the web server application, caused malicious code to take control of the web server. The primary behaviour of the malicious code was to propagate across networks very rapidly, and indeed, it was estimated that the Code Red virus was capable of infecting approximately half a million Internet Protocol (IP) addresses per day. A further effect was to deface web-sites present on the 'infected' server.

Thus, it will be appreciated that since computer networks facilitate the transfer of data across a large number of computer systems in a relatively short space of time, such vulnerabilities can enable malicious mobile code to propagate rapidly across large network areas. The costs involved in rectifying 'infected' systems can be very large and it follows that early identification of such vulnerabilities is important so that appropriate remedial action can be taken before the vulnerability is exploited.

A conventional method of determining whether computer systems on a network contain vulnerabilities is to perform a scan of Internet Protocol (IP) addresses on the network to identify the software programs present on computer systems having those IP addresses. The result is a list of IP addresses and associated software programs (including their version number). This information is collected centrally, e.g. by an organisation's IT department, and compared with a central database of known vulnerabilities associated with the identified software versions. It is then the task of the IT department to manually identify the physical machine/user from the IP addresses. This can be a difficult, time-consuming and costly task since the allocation of IP addresses does not necessarily correspond to the physical arrangement of computer systems, and the same IP address can even be assigned to different machines at different times. The task of transporting the appropriate remedy, e.g. a software 'patch', to the affected computer system or user usually involves some manual element. Once the computer system or user is identified, this process may involve sending an e-mail to the user informing them that they themselves need to apply the patch and where the patch is stored. It is then up to the user to effect the remedy in their own time.

It will be appreciated that this conventional method relies heavily on the accuracy of the information in the database which relates known vulnerabilities to identified software versions. Inaccurate information in the database can result in no vulnerability being indicated where, in fact, one exists. Alternatively, a vulnerability could be indicated when one does not exist. As will be appreciated from the above, the remediation method is also slow and can leave computer systems susceptible to virus attacks.

It is an object of the present invention to provide an improved method of identifying software vulnerabilities on a computer system, and an improved method of identifying software vulnerabilities in a computer network. It is also an object of the invention to provide an improved method of remediating identified software vulnerabilities. Other objects of the invention are to limit the effect of vulnerability identification methods on the normal operations of a computer network, and to perform such methods in an efficient way.

SUMMARY OF THE INVENTION

This invention relates to identifying a software vulnerability on a computer system having software stored thereon, the computer system being connected to a management system over a computer network. One or more interrogation programs are applied to the software, the interrogation programs being capable of exploiting a known software vulnerability if it is present in the software to which the interrogation programs are applied. In the event that the software vulnerability is exploited by an interrogation program, the program is operated to generate management information from which can be derived the identification of the computer system; and the management information is sent to the management system. This allows for accurate determination of whether or not a software vulnerability is present on the software of a computer system. By interrogating the software using a program capable of exploiting a known software vulnerability, it is possible to determine whether that software vulnerability is present from the result of the interrogation. The result of the interrogation generates management information from which can be derived an indication of the computer system, this information then being sent to a management system over a network connection.

Each interrogation program comprises code, at least part of which is able to exploit a known vulnerability. For example, each interrogation program may simply be embodied in a URL or 'http' request. The interrogation programs may be executable files, although this is not essential. The interrogation programs may each comprise code which takes control of a program running on a target machine. Other forms of interrogation program can be envisaged.

As mentioned previously, a software vulnerability may be considered a characteristic of the software which renders it susceptible to processing operations not intended to be permitted or performed by that software. Examples of software vulnerabilities include software features that enable hackers to manipulate the software in an unauthorised way or features that enable malicious mobile code (worms, executable computer viruses etc.) to access and/or manipulate the software. A buffer overflow attack (which could include a stack overflow attack) is an example of a processing operation which takes advantage of a software vulnerability.

A plurality of different interrogation programs may be applied to the computer system, each interrogation program being capable of exploiting a different known software vulnerability if it is present in the software to which the interrogation programs are applied, and wherein, in the event that the software vulnerability is exploited by one of the interrogation programs, the method further comprises operating that respective interrogation program to generate a further set of management information from which can be derived the identification of the software vulnerability so exploited.

The interrogation programs may further be arranged to remediate the known software vulnerabilities in response to them being identified. In each case, this is preferably performed automatically and electronically using the identity information corresponding to the computer system having the software vulnerability. It is particularly advantageous if the identity information is a network address corresponding to the computer system, e.g. an IP address, so that the management computer can automatically send, or cause to be sent, a remediation program over the network connection to the relevant computer system. This enables rapid remediation of identified software vulnerabilities, which is important for preventing a future 'attack' on that vulnerability.

The invention also relates to identifying software vulnerabilities in a computer network, the computer network comprising a plurality of computer systems having software stored thereon, a scanning system capable of sending at least one interrogation program to each of the computer systems, the at least one interrogation program being arranged to exploit a known software vulnerability if it is present in the software of the computer systems to which the interrogation program is applied, and a management system. The identification method comprises: operating the scanning system to apply the at least one interrogation program to the computer systems thereby to determine whether a known software vulnerability is exploited; in the event that a known software vulnerability is exploited, operating the interrogation program to generate management information at the computer system on which the known software vulnerability was exploited, the management information at least identifying the computer system on which the known software vulnerability was exploited; and sending the generated management information to the management system.

According to a particular aspect of the invention, there is provided a method of identifying software vulnerabilities in a computer network comprising a set of computer systems having software stored thereon, a scanning system, and a management system, wherein the method comprises: operating the scanning system to apply to at least one computer system of at least a subset of the computer systems a first interrogation program arranged to exploit a known software vulnerability; in the event that the known vulnerability is exploited, operating the first interrogation program to cause the computer system on which the known software vulnerability was exploited to apply to a plurality of the computer systems in the subset a second interrogation program arranged to exploit the known software vulnerability; in the event that the known vulnerability is exploited by the second interrogation program, operating the second interrogation program to generate management information at the computer system on which the known vulnerability was exploited by the second interrogation program, the management information at least identifying the respective computer system at which the known vulnerability was exploited; and sending the generated management information to the management system.

The second interrogation program is preferably incapable of causing the computer system on which the known software vulnerability was exploited to apply to other computer systems in the above-mentioned set an interrogation program capable of exploiting the known software vulnerability.

In one embodiment, the scanning system is operated as a single root scanning system in respect of the set of computer systems, the root scanning system applying the first interrogation program sequentially to computer systems of the said set. It is possible, however, to run a plurality of such root scanning systems concurrently, e.g. as multiple root scanner instances each scanning the computer systems of a respective subset or subsets of the said set of computer systems.

Typically, the first interrogation program is operated to cause the computer system on which the known software vulnerability was exploited by the first interrogation program to generate management information which is then sent to the management system.

At least the second of the interrogation programs is advantageously arranged so as to remediate, i.e. mitigate, the known software vulnerability it is arranged to exploit, wherein, in the event that the interrogation program exploits the vulnerability, the second interrogation program is operated to remediate that vulnerability.

Preferably, each root scanning system is capable of applying both the first and the second interrogation program.

As mentioned above, the scanning system may send an interrogation program or programs to multiple computer systems concurrently, i.e. in parallel. More particularly, the scanning may be divided across particular address ranges, e.g. IP address ranges, of the computer network. Thus, in the case that the above-mentioned set of computer systems comprises a plurality of subsets of computer systems, the subsets normally being topologically remote from each other, a preferred method includes the following steps:

(a) operating the scanning system to apply the first interrogation program to the computer systems of one of the subsets in turn;

(b) when said vulnerability is exploited in a computer system of said one subset:

the first interrogation program is operated on the computer system which was exploited by the first interrogation program to apply the second interrogation program to other computer systems of said one subset whereby, in the event that the vulnerability is exploited by the second interrogation program in a computer system of the first subset, the steps of generating and sending management information are performed on each computer system so exploited, and operation of the scanning system in respect of said one subset is terminated;

(c) steps (a) and (b) are performed in respect of others of the above-mentioned subsets concurrently or in turn, whereby whilst the second interrogation program is being applied to computer systems within each subset in which the vulnerability has been exploited by the first interrogation program, the scanning system applies the first interrogation program to the computer systems of subsets to which it has not hitherto been applied.

Each computer system may have an associated network address and the management information sent to the management system may include the network address of the computer system on which the known software vulnerability was identified. The network address may be the IP address of the computer system.

The scanning system and management system may be implemented on a single computer system forming part of the network or connected to the network. Alternatively, the scanning system and management system may be implemented on separate computer systems.

In the case of the interrogation program or programs being operable to remediate one or more software vulnerabilities, the management information generated by the at least one interrogation program may further comprise information indicative of the remediation operation performed. The remediation operation can be partial, and the management information generated by the at least one interrogation program can further comprise information indicative of the remediation operation performed and any remediation operation required.

In the event that a software vulnerability is exploited on one of the computer systems, the interrogation program may further operate to identify viruses present on the computer system, the management information including an identification of the or each virus so identified. Thus, since it is possible that an identified software vulnerability may already have been exploited by malicious code, such as a virus, it may be important to repair any damage done by that code before the actual vulnerability is remediated.

In response to receiving management information from a computer system indicating the presence of a software vulnerability, the management system may retrieve a remediation program appropriate to said known software vulnerability and send the retrieved remediation program to the computer system. The management system can retrieve the remediation program from a database storing a plurality of remediation programs, the retrieved remediation program being selected in accordance with the software vulnerability identified in the management information.

The management system may be configured to disable at least part of the computer network in response to receiving management information indicating the presence of a software vulnerability.

The management system may send an alert message to the or each computer system on which a vulnerability is identified in response to receiving management information indicating the presence of a software vulnerability. Indeed, the interrogation program can also be configured to cause such an alert to be displayed.

In addition, the management system may remotely stop the operation of the at least one interrogation program operating on the computer systems.

According to another particular aspect of the invention, there is provided a method of detecting a software vulnerability in computer systems contained in a computer network, each computer system having a respective address within the network, wherein the method comprises: running on a root system connected to the network a root scanning program which applies to a plurality of the computer systems that have addresses within a predefined address range a first interrogation program configured to detect a known software vulnerability; in the event that the vulnerability is detected, running the first interrogation program to cause the computer system in which the vulnerability was detected to scan computer systems that have addresses within at least a subset of the predefined address range by applying to those computer systems a second interrogation program configured to detect said vulnerability; in the event that the vulnerability is detected by the second interrogation program running the second interrogation program to cause the computer system in which it detected the vulnerability to run a mitigation program mitigating the vulnerability.

The first interrogation program may comprise a copy scanning program and a mitigation program, whereby the method includes the step of running the mitigation program on the computer system in which the software vulnerability was detected by the first interrogation program to mitigate the vulnerability of that computer system. The second interrogation program then comprises the mitigation program but does not have the copy scanning program.

It is preferred that the first and second interrogation programs each include an identification payload, whereby the vulnerability detecting method includes running the identification payload on each computer system in which the vulnerability is detected by the first or the second interrogation program to generate management information identifying that computer system and to send the management information to the root system.

In the preferred detection method, the first interrogation program includes a reporting payload which comprises program code operable on the computer system in which the vulnerability is exploited by the first interrogation program, whereby the detecting method includes a reporting step in which the reporting payload program code operates in conjunction with the scanning step of the last-mentioned computer system to generate report information relating to progress of the scanning step and to send the generated report information back to the root system. Generally, the report information will contain an indication of the completion of the scanning step (corresponding to completion of scanning of all of a predetermined plurality of computer systems having addresses in the above-mentioned subset of the predefined address range) and/or disabling the scanning step before completion. In the latter case, the root system may, itself, complete (partly or wholly) the scanning of the computer systems having the addresses in the above-mentioned subset to detect the software vulnerability in response to receipt of a report indicating disabling of the scanning step initiated in a computer system remote from the root system by the first interrogation program.

The invention may be in the form of a computer program stored on a computer usable medium, the computer program comprising computer-readable instructions arranged to operate under the control of processing means so as to identify a software vulnerability on a computer system. The computer program performs the steps of: applying an interrogation program to software stored on the computer system, the interrogation program being capable of exploiting a known software vulnerability if it is present in the software to which the interrogation program is applied; and in the event that the software is exploited by the interrogation program, operating the interrogation program to generate a set of management information from which can be derived at least the identification of the computer system on which the software vulnerability was exploited, the computer program being capable of sending the generated management information over a computer network.

Likewise, the computer program stored on a computer usable medium may comprise computer-readable instructions arranged to operate under the control of processing means so as to identify software vulnerabilities in a computer network to which the processing means is connected, the computer network comprising a plurality of computer systems having software stored thereon, the computer program performing the steps of: (a) sending at least one interrogation program to each computer system, the at least one interrogation program being arranged to (i) exploit a known software vulnerability if it is present in the software of the computer system to which the interrogation program is applied, and (ii) operate the interrogation program to generate management information at the computer system on which the known software vulnerability is exploited, the management information identifying the computer system and the particular software vulnerability present on that computer system; and (b) receiving management information generated by each interrogation program.

The computer program may be arranged to generate, in accordance with the received management information, a database of computer systems on the computer network which have particular software vulnerabilities.

The management information received may include a respective network address associated with each computer system on which the software vulnerability was identified. The network address may be the IP address of the respective computer system.

It will be appreciated that each interrogation program sent by the computer program may be further capable of remediating the software vulnerability it is capable of identifying, and wherein in the event that the interrogation program identifies a software vulnerability, the interrogation program may operate to remediate said software vulnerability.

In response to receiving management information from an interrogation program indicating the presence of a particular software vulnerability, the computer program may operate so as to acquire a remediation program appropriate to the particular software vulnerability and then send said retrieved remediation program to the interrogation program.

The invention may also be provided in the form of a computer program stored on a computer usable medium, the computer program comprising computer-readable instructions arranged to operate under the control of processing means at a location remote from a root system so as to identify a software vulnerability on a computer system having software stored thereon, the computer program being arranged: to interrogate the software of topologically local computer systems to detect the presence of a known software vulnerability if it is present in the software; in the event that a vulnerability is detected in an interrogated computer system, to generate a set of management information from which can be derived the identification of such a computer system; and to send the management information via the computer network to the root system or a separate management system.

The invention will now be described, by way of example, with reference to the drawings.

BRIEF INTRODUCTION OF THE DRAWINGS

In the drawings:

FIG. 1 is a schematic diagram of a computer network;

FIG. 2 is a block diagram of a computer system connected to the computer network represented in FIG. 1;

FIG. 3 shows a modified part of the computer network represented in FIG. 1;

FIG. 15 is an address range table;

DETAILED DESCRIPTION OF THE PREFERRED EMBODIMENTS

Figures 4, 5:
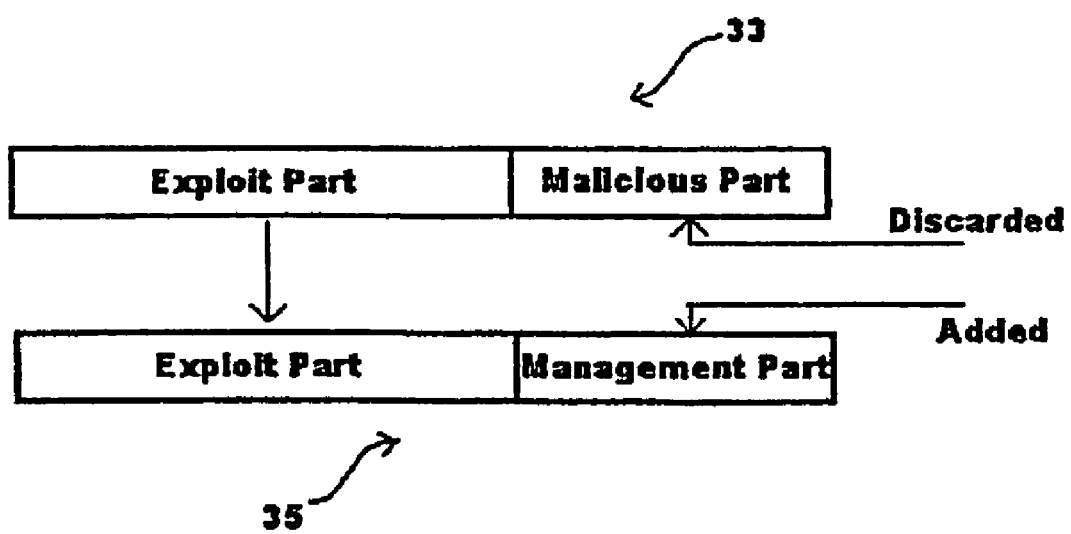
FIG. 4 is a block diagram representing a database for storing so-called 'exploit programs'.
FIG. 5 is a block diagram indicating a design process for generating an exploit program.

Referring to FIG. 1, a computer network 1 has first, second and third computer systems 3, 5, 7, and a management computer 11. The management computer 11 is typically located remotely from the first to third computer systems 3, 5, 7 and may be operated under the control of IT department staff. Indeed, in this example, the remote location of the management computer 11 is represented by the dotted line 13. Although only first to third computer systems 3, 5, 7 are shown, it will be appreciated that many other computer systems can be connected to the computer network 1, either directly, or by means of other network links 15. Each of the first to third computer systems 3, 5, 7 has a number of software programs stored thereon which are executed by processing means of each respective computer system. For example, each of the first to third computer systems 3, 5, 7 may be provided with an operating system, a word processing package, and a web server which enables connection to the Internet.

FIG. 2 is a generalised block diagram showing the functional elements of the first computer system 3, although it should be understood that the second and third computer systems 5, 7 have the same elements. Referring to FIG. 2, the first computer system 3 comprises a processing means 21, a visual display unit (VDU) 23, and input means 25. The processing means 21 is programmed with a network address in the form of an IP address. It will be appreciated that the IP address can be used by computer systems on the computer network 1, including the management computer 11, to communicate with the first computer system 3. Indeed, the IP address enables the management computer 11 to connect with the first computer system 3 without requiring knowledge of its physical location. The processing means of the second and third computer systems 5, 7 are configured with different respective IP addresses. As mentioned previously, it is possible for the same IP address to be assigned to different machines at different times.

The function of the management computer 11 is at least to identify software vulnerabilities present on the software programs running on the first to third computer systems 3, 5, 7. In a further embodiment, described below, the management computer 11 is also arranged to remediate, i.e. mitigate, the or each software vulnerability it is able to identify.

As will be discussed further below, the management computer 11 is specifically configured to identify a plurality of known software vulnerabilities. In this respect, it will be appreciated that when a software vulnerability is initially discovered, which may be as a result of legitimate investigations by software engineers, details of the software vulnerability may be made available so that an appropriate remediation operation can be applied or developed to mitigate the vulnerability, for example by removing the vulnerability or at least making it difficult to take advantage of the vulnerability. Knowledge of the software vulnerability also enables the formulation of programs which are specifically designed to take advantage of, or exploit, the known vulnerability thereby to enable unauthorised operations to be performed on the software, e.g. by means of a virus attack. Indeed, a software vulnerability may only be discovered by the public at large when such a virus attack is discovered on a computer system. In the embodiments described herein, such an exploitation method is used to identify whether or not that software vulnerability is present.

The management computer 11 shown in FIG. 1 is a single processing system that performs two main functions. One function is that of scanning each of the first to third computer systems 3, 5, 7 in order to identify whether a software vulnerability is present in the software running thereon. A second function is that of collecting management information, at least from those computer systems on which a software vulnerability is discovered. In functional terms, therefore, the management computer 11 may be considered a single processing system operating a scanning system and a data management system. In an alternative arrangement, indicated in FIG. 3, separate first and second processing means 17, 19 may be used, the first processing means being arranged to perform the scanning operation and the second processing means being arranged to collect the management information.

As mentioned above, the management computer 11 is arranged to scan each of the first to third computer systems 3, 5, 7 in order to identify whether a software vulnerability is present. This scanning operation is performed by accessing a database of interrogation programs, hereafter referred to as "exploit programs", and applying those exploit programs to the first to third computer systems 3, 5, 7. FIG. 4 shows an exemplary database 29 of exploit programs. The database 29 can be stored internally within the management computer 11, or externally from the management computer (assuming that appropriate security measures had been taken). As will be seen, in this case, the database 29 stores four different exploit programs, referred to as $E_1$-$E_4$, each of which is specifically designed to exploit a different known software vulnerability Vn, labelled $V_1$-$V_4$ respectively. The presence of one of the software vulnerabilities $V_1$-$V_4$ on any of the first to third computer systems 3, 5, 7 will be identified in the event that one of the exploit programs $E_1$-$E_4$ successfully exploits software on one of the computer systems. When this occurs, the 'successful' exploit program on the exploited computer system generates management information which is then sent back to the management computer 11 over the computer network 1. The management information will indicate the identity of the computer system on which the vulnerability was exploited, for example by using the IP address of that computer system. The management computer 11 is then able to establish which of the first to third computer systems 3, 5, 7, if any, has particular software vulnerabilities.

The management computer 11 may scan each of the first to third computer systems 3, 5, 7 concurrently, i.e. so that the exploit programs $E_1$-$E_4$ are applied in sequence to each of the first to third computer systems in parallel. In computer networks having much larger numbers of computer systems, it may be appropriate to divide the scanning process in a controlled manner, for example by limiting the scanning operation to particular ranges of IP address.

As already mentioned, each exploit program $E_1$-$E_4$ is designed based on knowledge of the particular software vulnerability it is required to exploit.

One method of designing an exploit program is to identify an already-available program, such as a computer virus, which is known to be capable of exploiting the software vulnerability. The malicious program is then reverse engineered to identify an "exploit part" of the program, which allows the software vulnerability to be accessed, and a "malicious part" of the program, which performs the malicious operation on the accessed software. The "malicious part" is then discarded and replaced with a "management part" which performs the task of generating the management information for sending back to the management computer 11. The "management part" can be designed to perform a number of useful management tasks and has to be carefully coded so as not to cause problems once the exploit program has accessed the software. For example, the "management part" will not usually allow the exploit program to propagate to further computer systems which may cause problems if the propagation becomes uncontrollable. As will be discussed further below, the "management part" can also include remediation means to remove or mitigate the exploited software vulnerability. FIG. 5 illustrates the method described above wherein a malicious program 33 is reverse engineered to identify the "exploit part" and the "malicious part", the former being used in an exemplary exploit program 35 along with a "management part".

A further method of designing an exploit program is simply to start from first principles. Once it is understood how and why a software vulnerability makes the software susceptible to an attack, a computer program is designed which is able take advantage of the vulnerability. This method is generally more time consuming.

Figure 6:
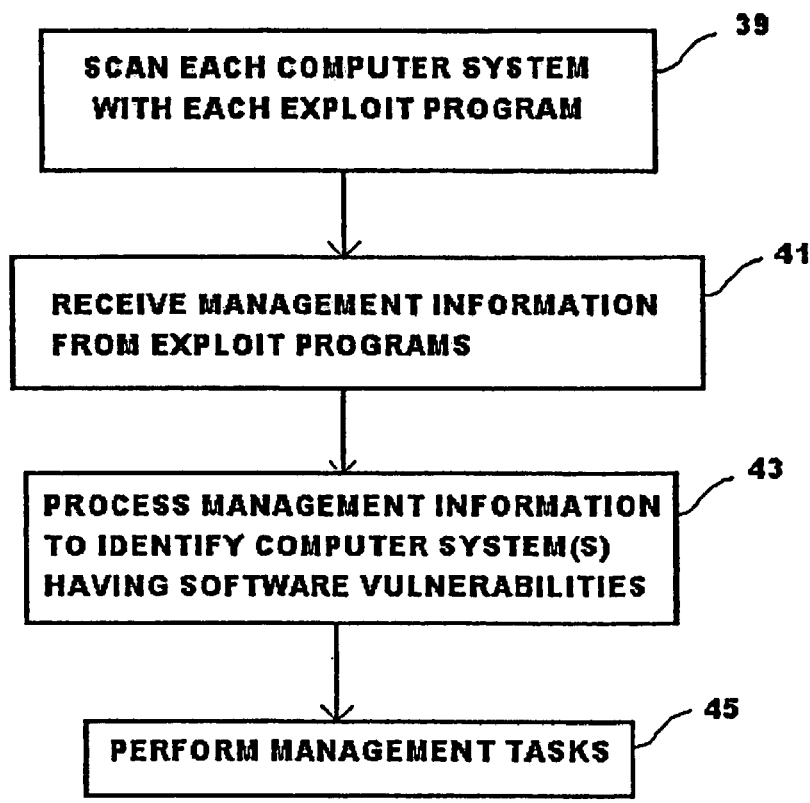
FIG. 6 is a flow chart showing the operating steps of computer software running on a management computer of the computer network represented in FIG. 1.
Figure 7:
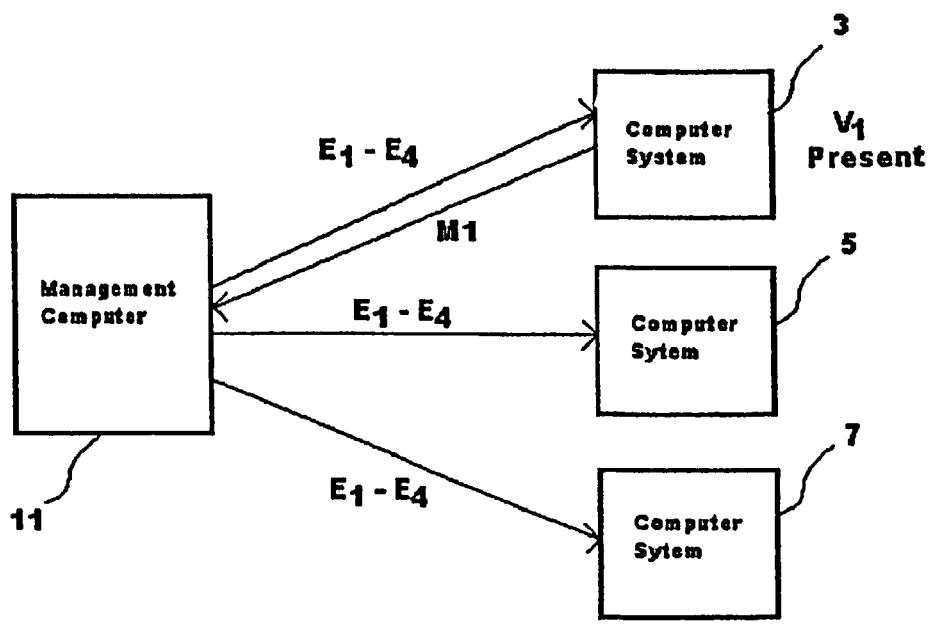
FIG. 7 is a schematic diagram of the computer network represented in FIG. 1 in the case that a software vulnerability is present on a computer system connected to the network.

The general operation of the management computer 11 will now be described with reference to the flow chart of FIG. 6 and the schematic network diagram of FIG. 7. The different steps indicated in the flow chart of FIG. 6 may be implemented in a computer program configured to run on the management computer 11.

In a first step 39, each of the first to third computer systems 3, 5, 7 is scanned by the management computer 11 by means of it applying each exploit program $E_1$-$E_4$ to software running on those computer systems. The general operation of each exploit program $E_1$-$E_4$ will be described further below. In a second step 41, the management computer 11 waits for receipt of any management information which is generated by each exploit program $E_1$-$E_4$ in order to indicate that it has exploited a particular software vulnerability. Upon receiving such management information, in a third step 43, processing of the received management information is performed to identify which of the first to third computer systems 3, 5, 7 have particular software vulnerabilities. In a final step 45, management tasks are performed based on knowledge of the management information processed in the third step 43. Referring to FIG. 7, in the exemplary case shown, a software vulnerability $V_1$ is identified on the first computer 3 by the exploitation program $E_1$ and so management information is generated at the first computer 3 and sent back to the management computer 11. Since the management information is returned by the exploitation program $E_1$ and will indicate that it is sent from the first computer 3, the management computer 11 will determine that the first computer has the software vulnerability $V_1$.

The management tasks performed in step 45 may include sending a message to a user of the relevant computer system, informing them of the presence of the vulnerability, and indicating further action that should be taken. This may involve notifying the user that an appropriate remediation program can be applied and where the remediation program is stored. Alternatively, the remediation program can be sent to the user as an attachment to an e-mail message. The management operation may involve shutting the relevant computer system down, or even disabling part of the computer network to which the relevant computer system is connected. Given that a software vulnerability has been identified, it may be useful to apply a virus-checking program to the relevant computer system so as to determine whether that computer system has already been exploited by malicious code.

Figures 8, 9:
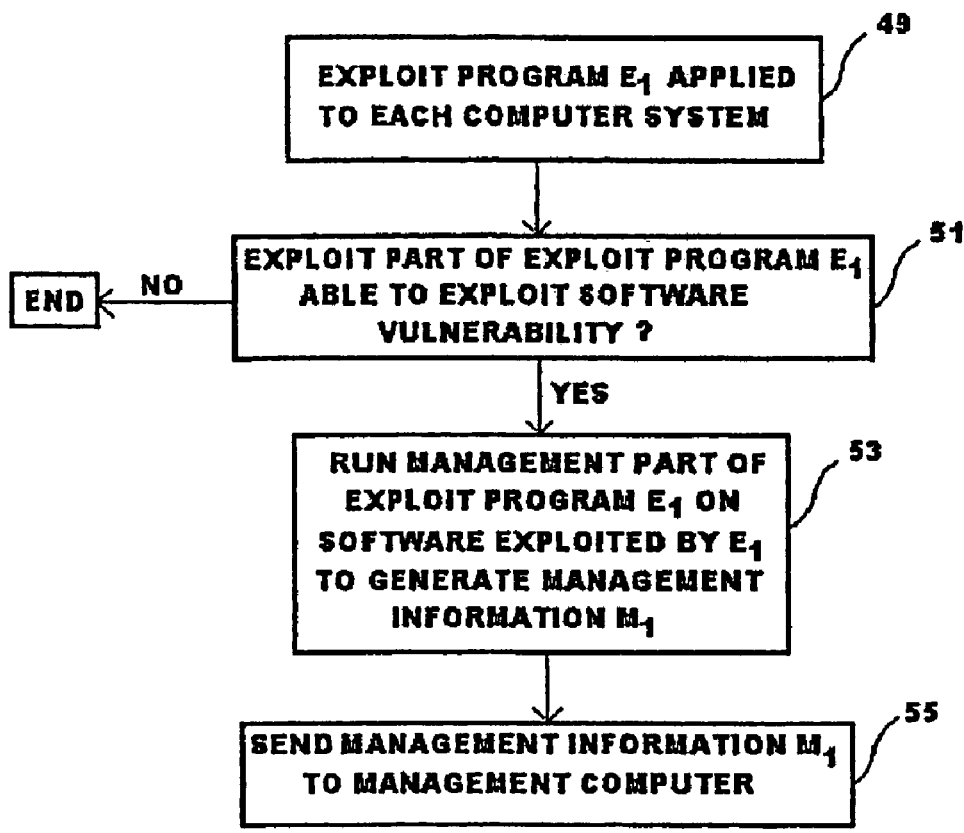
FIG. 8 is a flow chart showing the operating steps of an exploit program used by the computer software running on the management computer.
FIG. 9 is a block diagram representing a database for storing modified exploit programs for use in a method according to a further embodiment of the invention.

The general operation of a first one of the exploit programs, $E_1$, will now be described with reference to the flow chart of FIG. 8. It will be appreciated that the second to fourth exploit programs $E_2$-$E_4$ will operate in substantially the same way. As with the schematic network diagram of FIG. 7, the first computer 3 is assumed to have the software vulnerability $V_1$ which can be exploited by the first exploit program $E_1$.

In a first step 49, the first exploit program $E_1$ is applied to each of the first to third computer systems 3, 5, 7. In a second step, 51, the first exploit program $E_1$ attempts to access software running on each of the first to third computer systems 3, 5, 7 by means of the software vulnerability $V_1$. In the event that the first exploit program $E_1$ is successful, as will be the case with the first computer 3, a third step 53 is entered whereby a "management part" of the exploit program runs on the accessed software of the first computer 3 to generate management information $M_1$ for sending back to the management computer 11. In a fourth step 55, the generated management information $M_1$ is sent to the management computer 11. The operation of the management computer 11 thereafter has already been described above with reference to FIG. 7. In the event that the first exploit program $E_1$ does not successfully access the software, as will be the case with the second and third computer systems 5, 7, the exploit program ends.

The "management part" of the exploit program $E_1$ is arranged to generate at least an indication of the 'relevant' computer system on which the vulnerability $V_1$ is present. In this embodiment, the IP address of the first computer system 3 is used, although other identification means could be used. Use of the IP address is particularly advantageous since the management computer 11 does not need to know the physical location of the first computer system 3 or even the identity of the user operating the first computer system. Using the IP address enables data communications between the management computer 11 and the first computer 3 over the computer network 1. Thus, the management computer 11 can establish contact with the first computer 3 and perform any management tasks deemed necessary. As mentioned above, these management tasks may involve alerting a user that a vulnerability exists, or even shutting that computer system down. This is done electronically and so very rapidly.

The "management part" of the exploit program $E_1$ may further be arranged to generate other forms of management information. This information may give further details on the vulnerability so identified, or whether the computer system is also infected by malicious code, such as a worm or virus. It may also be desirable to know the time when the software vulnerability was identified. The management computer 11 may then send a message to the relevant computer system giving users thereof a finite time limit from the 'time of identification' to remedy the vulnerability before the computer system is shut down. The "management part" may attempt to discover likely users of the relevant computer system so that an e-mail can be sent to those users' own e-mail addresses. This may be performed by the management part interrogating log-in files and/or e-mail in-boxes. The "management part" may also assess the hardware and software configurations of the relevant computer system to assess any damage that has already been done.

Second and third preferred embodiments of the invention will now be described with reference to FIGS. 9 to 12. In these embodiments, the management computer 11 is further configured to apply remediation means to those computer systems on which a software vulnerability is identified. As mentioned above, knowledge of the existence of a software vulnerability enables the design of software for remediating that vulnerability. Remediation may involve attempting to remove the vulnerability, either fully or partially, or at least changing the vulnerability in some way so that the task of exploiting it is made more difficult. Partial remediation may be preferable if the complete remediation requires a relatively large piece of software that cannot be transported efficiently over the computer network 1. Partial remediation may also be preferable if complete remediation requires actions that cannot be reliably carried out without some form of human interaction In the second preferred embodiment, each exploit program $E_1$-$E_4$ in the database 29 shown in FIG. 4 is modified so that an additional "remediation payload" part $R_1$-$R_4$ is included. $R_1$ is arranged to remediate the software vulnerability which can be exploited by $E_1$, $R_2$ is arranged to remediate the software vulnerability which can be exploited by $E_2$, and so on. A database 29' storing the modified exploitation programs $E_1'$-$E_4'$ is represented in FIG. 9.

Figure 10:
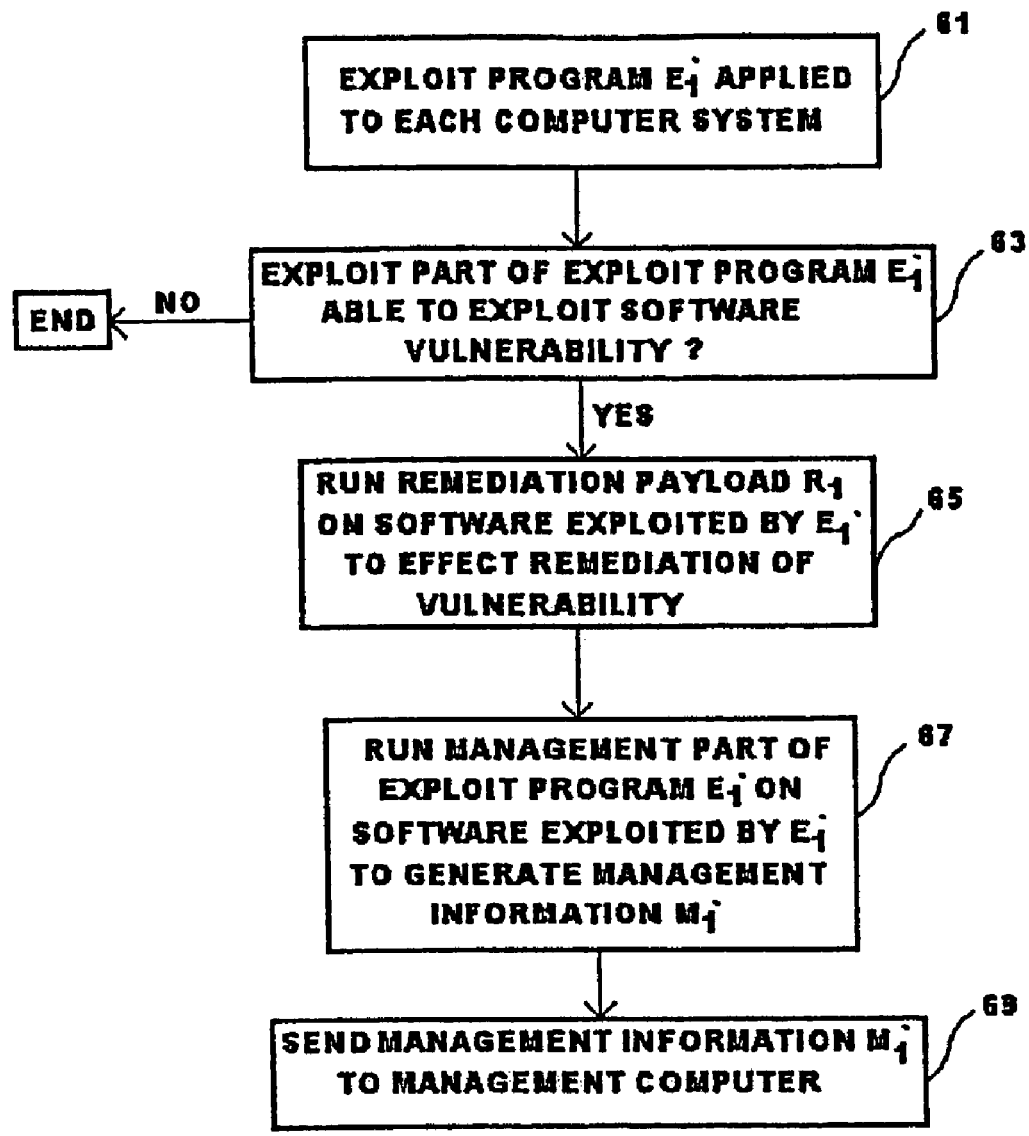
FIG. 10 is a flow chart showing the operating steps of a modified exploit program.

The general operation of a first one of the modified exploit programs, $E_1'$, will now be described with reference to the flow chart of FIG. 10. It will be appreciated that the second to fourth modified exploit programs $E_2'$-$E_4'$ will operate in substantially the same way as $E_1'$. As with the case shown in FIG. 6, the first computer 3 is assumed to have the software vulnerability $V_1$.

In a first step 61, the first exploit program $E_1'$ is applied to each of the first to third computer systems 3, 5, 7. In a second step, 63, the first exploit program $E_1'$ attempts to access software running on each of the first to third computer systems 3, 5, 7 by means of a known software vulnerability $V_1$. In the event that the exploit part of the first exploit program $E_1'$ is successful, as will be the case with the first computer 3, a third step 65 is entered whereby the remediation payload $R_1$ of the first exploit program $E_1'$ is executed on the accessed software so as to run a remediation operation. In a fourth step 67, the "management part" of the exploit program $E_1'$ runs on the accessed software of the first computer 3 to generate management information $M_1'$ for sending back to the management computer 11. In a fifth step 69, the generated management information $M_1'$ is sent to the management computer 11. The management information $M_1'$ may include details of the remediation operation performed. In the event that the first exploit program $E_1'$ does not successfully access the software, as will be the case with the second and third computer systems 5, 7, the exploit program ends.

Figure 11:
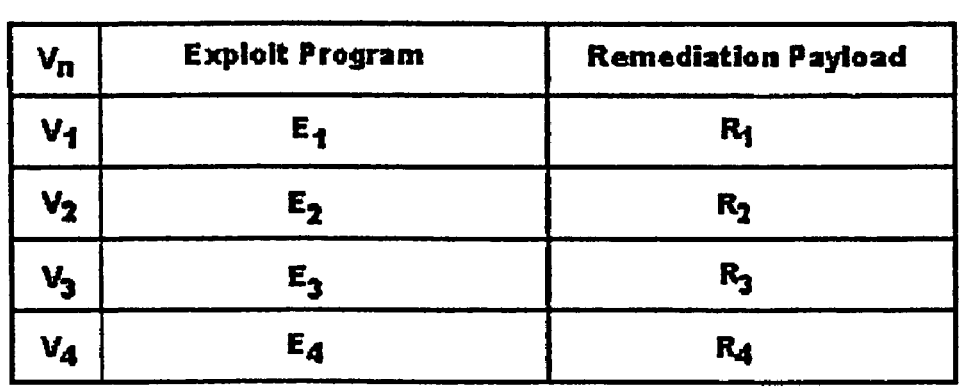
FIG. 11 is a block diagram representing a database for storing modified exploit programs for use in a method according to a yet further embodiment of the invention.
Figure 12:
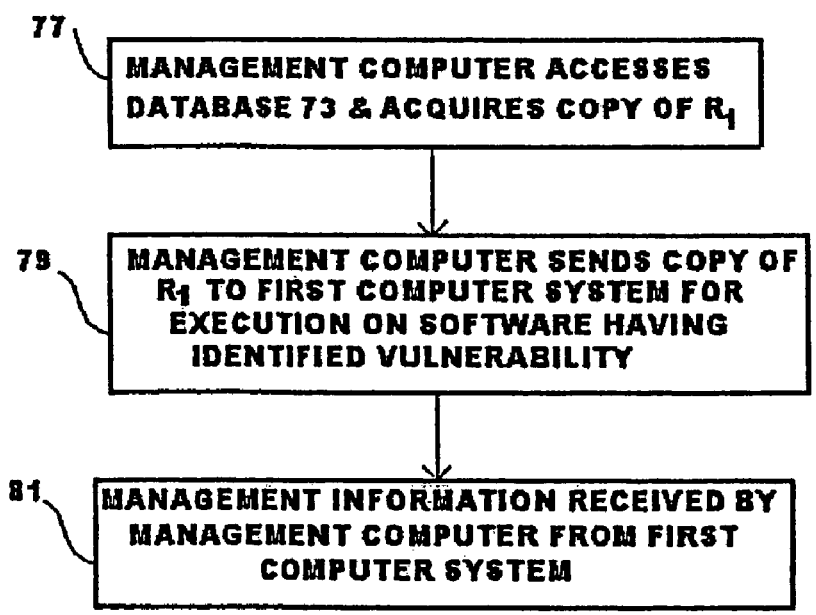
FIG. 12 is a flow chart showing the operating steps of computer software running on the management computer of the computer network, the management computer operating according to the yet further embodiment of the invention.

A third preferred embodiment of the invention will now be described with reference to FIGS. 11 and 12. This third embodiment is similar to the second embodiment in that the management computer 11 is configured to apply remediation means to those computer systems on which a software vulnerability is identified. However, rather than including an appropriate remediation payload with the sent exploit program, a remediation payload is sent separately to one or more of the first to third computer systems 3, 5, 7 in accordance with the software vulnerabilities identified thereon. To facilitate this, each exploit program $E_1$-$E_4$ is associated with a respective remediation payload $R_1$-$R_4$. As with the second embodiment, $R_1$ is arranged to remediate the software vulnerability which can be exploited by $E_1$, $R_2$ is arranged to remediate the software vulnerability which can be exploited by $E_2$, and so on. An exemplary database 73 storing the exploit programs and their associated payloads is represented in FIG. 11.

In this case, remediation of an identified software vulnerability is effected by means of the management computer 11 fetching the appropriate remediation payload in accordance with the vulnerability identified in the management information. FIG. 12 shows the steps involved in performing the remediation operation, taking the situation shown in FIG. 7 as an example. The steps illustrated in FIG. 12 may be considered an example of a management task performed in the fourth step 45 of FIG. 6. It is assumed that the management computer 11 has received management information $M_1$ indicating that the first computer system 3 has the software vulnerability $V_1$.

In a first step 77, the management computer 11 accesses the database 73 and acquires a copy of the remediation payload $R_1$. In a second step 79, the remediation payload is sent to the first computer system 3. The remediation payload $R_1$ is applied to the first computer system 3 and executed. In a third step 81 further management, indicative of the remediation operation performed, is sent back to the management computer 11.

As mentioned above, with reference to FIG. 3, instead of employing a single management computer 11 to perform the scanning operation and collection of management information, it is possible to use separate first and second processing means 17, 19. In this arrangement, the second processing means 19 acquires the appropriate remediation payload $R_1$ in response to receiving the management information from one of the first to third computer systems 1, 3, 7.

When applying the appropriate remediation means to one of the first to third computer systems 1, 3, 7 it is not essential to access the software of the computer system using the software vulnerability so identified. Indeed, any other vulnerability or corporate access agent/backdoor can be used to access the software and remediate the vulnerability so identified.

The techniques described above constitute a distribution mechanism deploying a vulnerability remediation package which mitigates one or more software vulnerabilities in computer systems of the network. However, such techniques can be too slow for mitigation in a large network such as that illustrated in part in FIG. 13.

Figure 13:
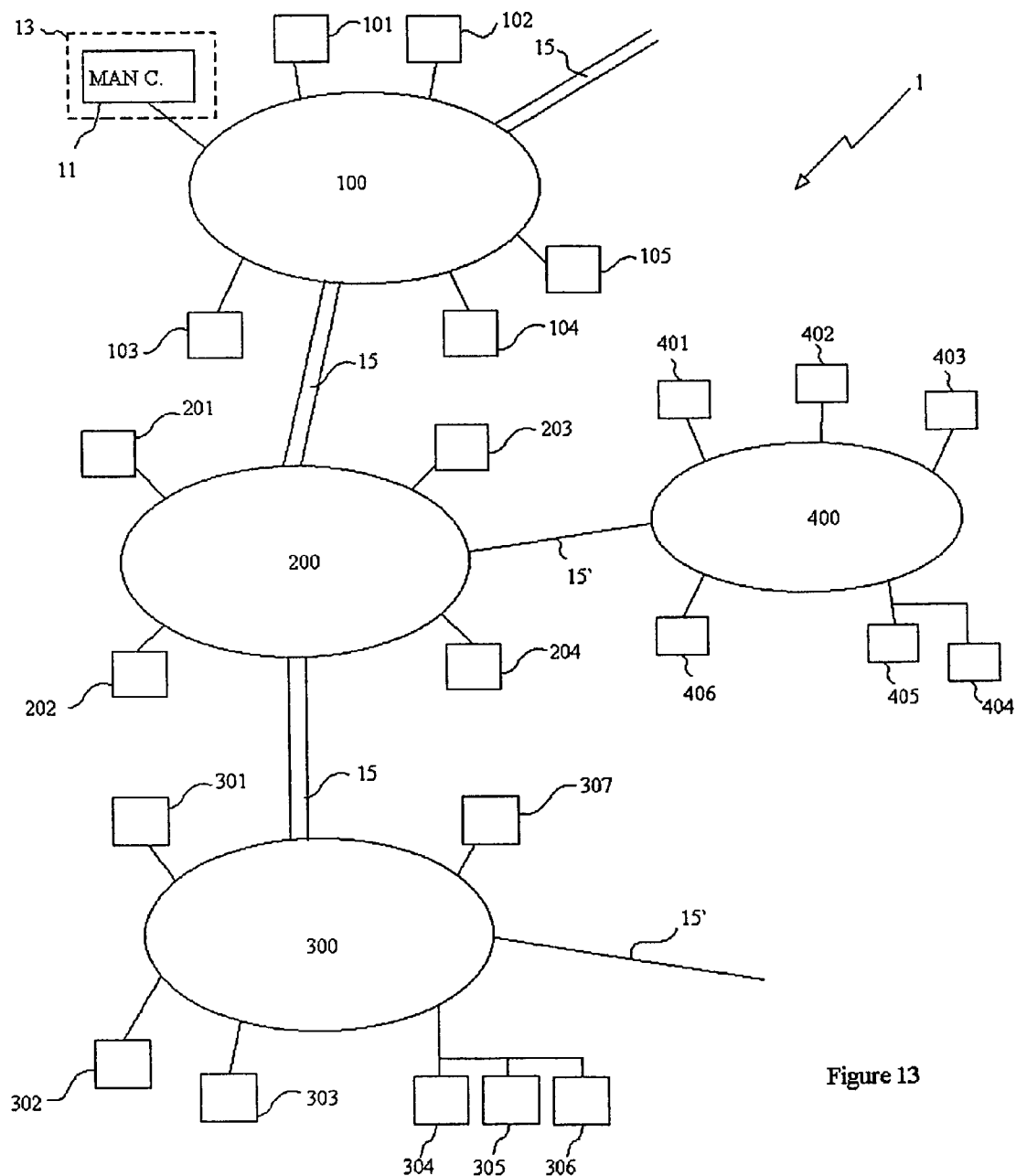
FIG. 13 is a schematic diagram of a second computer network comprising groups of computer systems at locations remote from each other.

Referring to FIG. 13, a typical large network has a number of groups 100, 200, 300, 400 of computer systems, each group being at a location which is more or less remote from other locations in the network in terms of the ease with which data may be communicated. In this exemplary network, some of the locations are interconnected by broadband links 15 whereas others have links 15' of lesser bandwidths. Thus, for instance, in terms of communication efficiency and subject to latency in the links, group 400 is topologically more remote from its linked neighbour than are the other groups shown in FIG. 13 from their respective neighbours. Each group 100, 200, 300, 400 contains a number of computer systems 101 to 105, 201 to 204, 301 to 307 and 401 to 406). It will be understood that FIG. 13 is schematic, in that as it shows network 1 in greatly simplified form. In practice, each group 100, 200, 300, 400 has very many more computer systems than shown. The network 1 also includes a management computer 11 which may, itself, be at a remote location 13. In the description which follows, the management computer is referred to as the "root system" in view of the role it plays in the vulnerability identification and remediation techniques to be described.

Given the widespread distribution of computer systems in the network 1 and the varying nature of the links between different remote locations, it will be appreciated that such a network imposes considerable efficiency limitations on the techniques described above with reference to FIGS. 1 to 12.

One way of distributing a vulnerability remediation package at potentially greater speed is to use a worm-like distribution mechanism whereby the remediation package is accompanied by program code which is run by vulnerable systems to search for other vulnerable systems, thereby to spread the distribution mechanism and the mitigation package to them as well. Such a method can be highly effective at locating vulnerable systems and mitigating them, but it may not be especially efficient because every computer system which was vulnerable will eventually have the code running on it, searching for new vulnerable systems. Such a situation may be detrimental to the network 1. The speed at which vulnerable systems are detected, the scope of the address range covered, the weighting of topologically near and far addresses, as well as any limit on the number of "infection" attempts in terms of time or number all affect the time taken to accomplish delivery of the mitigation package to all vulnerable systems in the network. Such considerations also determine the impact and variability of the distribution mechanism on the network performance, and the time period over which such impact will be experienced. Another disadvantage of worm-like distribution is that it can be difficult to verify that all potentially vulnerable computer systems have been detected.

The single-level mechanisms described above with reference to FIGS. 1 to 12 have advantages in as much as the mitigation or remediation can be started, controlled, and monitored from a single system, and the propagation will not continue exponentially nor spread beyond an address range or space specified by the management computer.

The technique to be described below, however, offers further advantages, particularly in large and complex networks.

Figure 14:
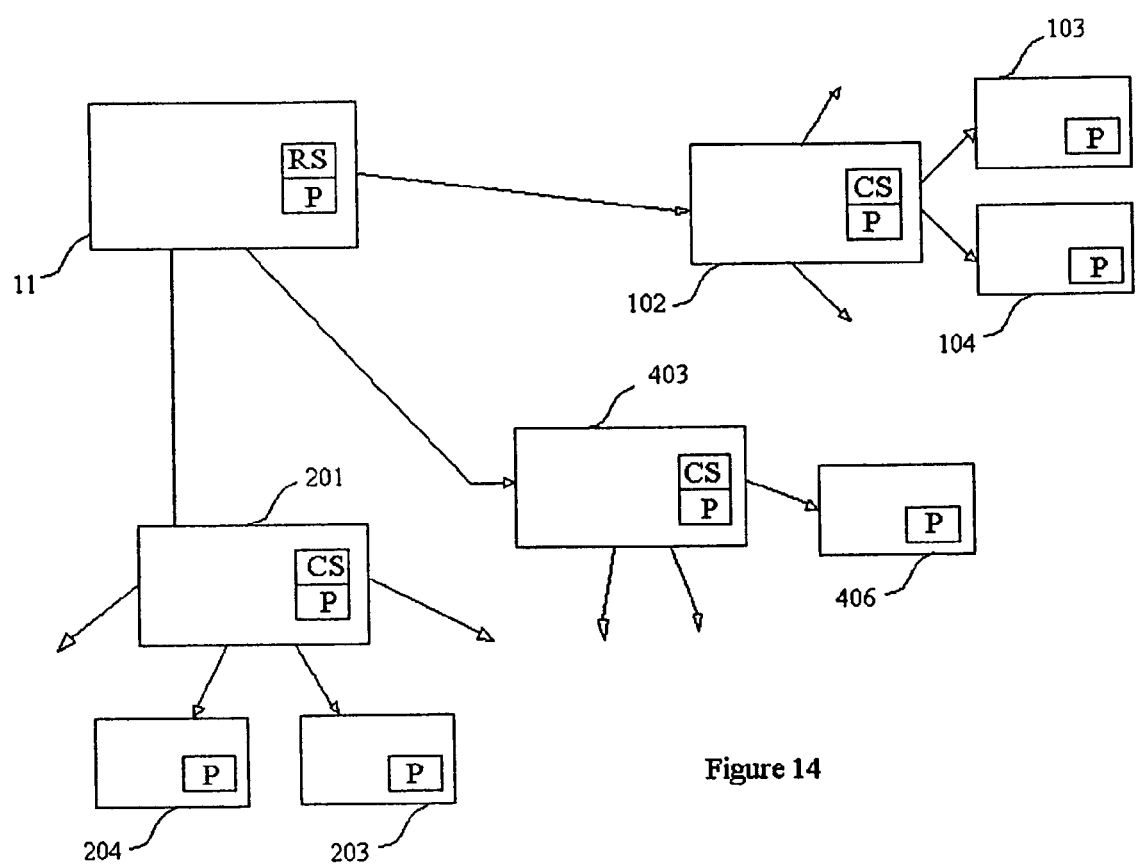
FIG. 14 is a schematic diagram illustrating the propagation of exploit programs in the network of FIG. 13.

Referring to FIG. 14, a distribution mechanism for distributing a mitigation payload to vulnerable computer systems in the network has a root system 11 (the management computer in the previously described techniques) which contains software in the form of a root scanning process (hereinafter referred to as the "root scanner") RS and a vulnerability mitigation payload P. The root scanner is run on a single system, here the root system 11. The root scanner comprises a first exploit program which is arranged to exploit the known software vulnerability and the root scanner scans for the vulnerability on the computer systems within a predefined address range of space. Thus, referring to FIG. 13, it may first apply the exploit program to the computer system 101 to 105 having addresses within a first address range mapping onto the group 100. The address referred to in this context are typically IP addresses such as those shown in the table of FIG. 15. Accordingly, the first address range, corresponding to the computer system group 100 at a first location may have a number of computer systems with IP addresses in the range 15.144.* (15.144.000.000 to 15.144.255.255), for instance.

Referring again to the simplified network diagram of FIG. 13, the scanner may attempt to exploit, firstly, computer system 101 which, in this example, does not have the vulnerability, in which case the root scanner next applies the exploit program to computer system 102. In this example, computer system 102 does contain the vulnerability. As a result, the scanner (a) "infects" the vulnerable system with a nearly identical copy, copy scanner CS, of itself, as shown in FIG. 14, and (b) sends the mitigation payload P to mitigate the vulnerability. Like the root scanner, the so-called "copy scanner" or secondary scanner begins to scan for the same vulnerability using a second exploit program, and using the same address range or a subset of that range. In other words, the copy scanner applies the second exploit program to the so far unchecked computer systems in group 100, i.e. 103 to 105 in this simplified example, and when it finds a vulnerable system, in this case systems 103 and 104, it infects each with the mitigation payload P, as shown in FIG. 14. Mitigation payload P does not contain a scanner. Consequently, the systems mitigated as a result of operation of the copy scanner are not able to scan, infect, or mitigate any other computer systems.

As soon as the root scanner RS has located a vulnerable computer system in the first predefined address range, i.e. the address range corresponding to group 100 in this example, it stops scanning for vulnerable systems in that address range. Depending on the configuration of the root scanner it may then wait for the copy scanner to finish before scanning another address range, or it may skip ahead immediately to a new address range, or, if it has been concurrently scanning other address ranges, it may simply continue doing so. In the illustrated example, there is a new address range in a new remote site which, in this example, is the site of group 200 which, as shown in FIG. 15, has addresses in the range 15.125.* (15.125.000.000 to 15.125.255.255). In scanning this new address range, the root scanner repeats the process described above with reference to group 100, applying the first exploit program to each of the computer systems in group 200. As shown in FIG. 14, on this occasion, the first computer system in which the vulnerability is detected is computer system 201. Again, the root scanner causes a copy scanner to be run on the infected compute system, as well as mitigating the vulnerability with the mitigation payload P.

As described above, the deposited copy scanner then begins to scan other computer systems within group 200 (i.e. having addresses within the range 15.125.*), and when vulnerabilities are detected, the relevant systems (203, 204) receive the mitigation payload which is then run to remove the vulnerability in each case.

The root scanner, again, as a result of detecting a vulnerability in group 200, stops its scanning operation with respect to that group, but skips to or continues with another address range such as that corresponding to group 400 (FIG. 13) where it may find its first vulnerable computer system to be computer system 403 which, in turn, scans the remaining computer systems in group 400 and finds system 406.

Operation of the root scanner and copy scanner will now be described in more detail with reference to FIGS. 16 and 17.

Figure 16:
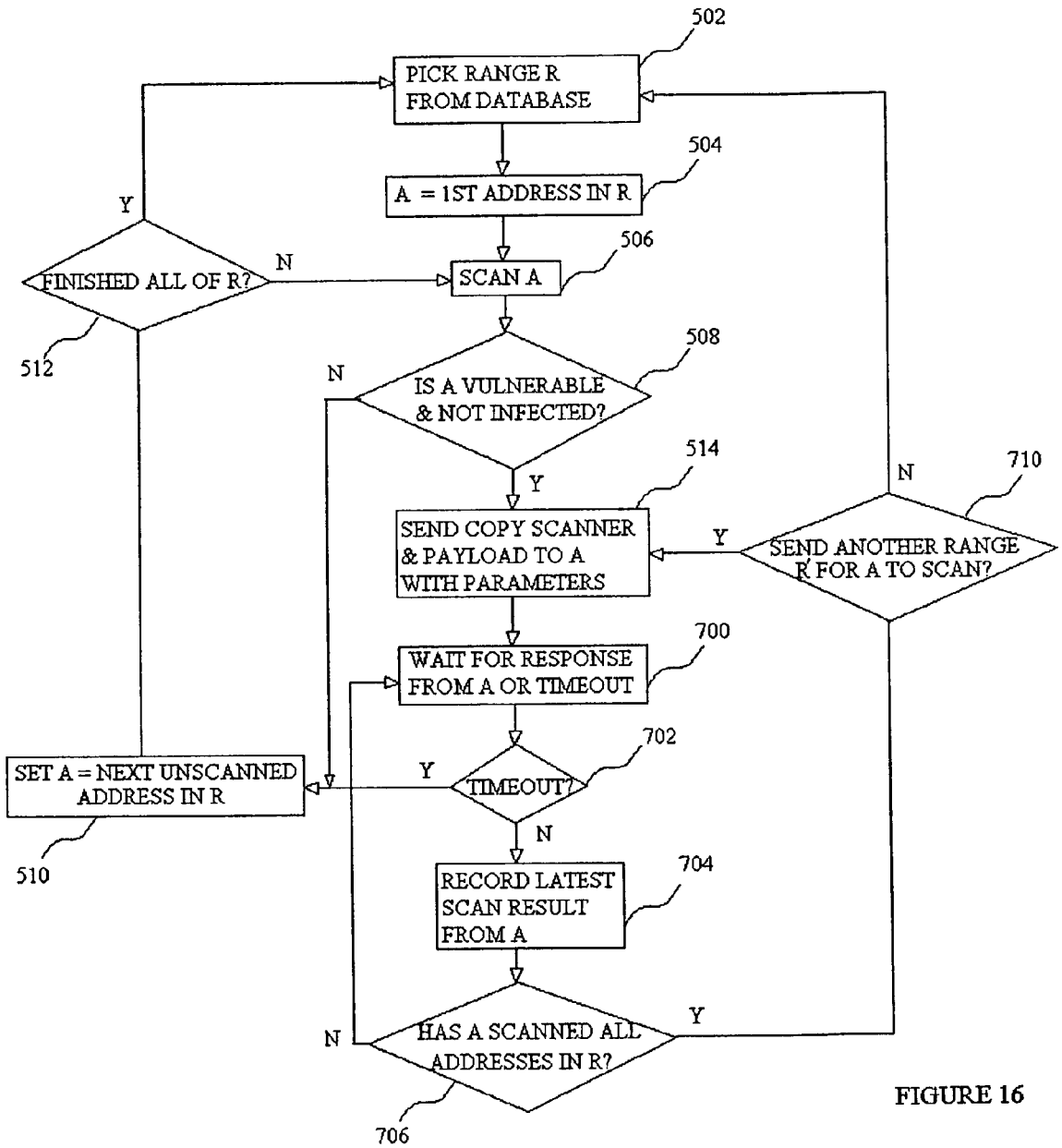
FIG. 16 is a flow chart of a root scanning process.

Referring to FIG. 16, operation of one root scanner embodiment begins with selecting an address range R from the database accessible by root system 11 (502). Next, a specific address A is selected as the first address in range R (504) and the first exploit program is applied to the computer system corresponding to address A (i.e. the scanner scans A) (506).

If the system at address A does not contain the known software vulnerability or if it contains the vulnerability but the vulnerability has already been mitigated (query block 508) A is set to the next unscanned address in range R (510) and, providing there are still unscanned addresses in R (512), the scanning process restarts at the new address A (506).

If, on the other hand, the first address A corresponds to a system containing the software vulnerability and the vulnerability has not been mitigated (step 508 again), the root scanner sends the so-called copy scanner and a mitigation payload to the computer system having the address A, together with a set of parameters defining operation of the copy scanner running as a program on the vulnerable computer system (514).

Figure 17:
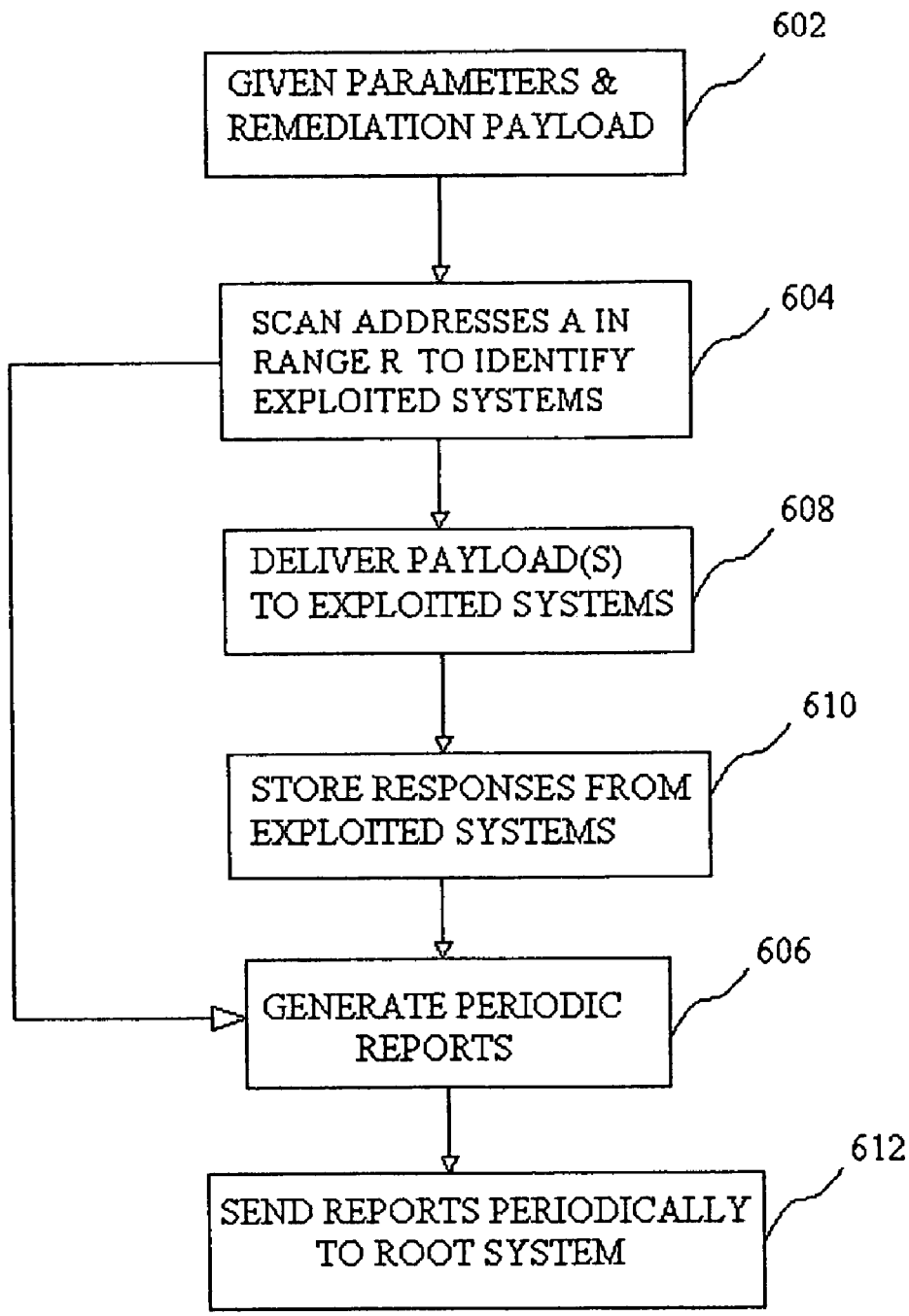
FIG. 17 is a flow chart of a secondary scanning process.

At this point, it is convenient to refer to FIG. 17, which is a flow chart showing the operation of the copy scanner in simplified form.

The parameters given to the first-detected vulnerable computer system include a list of payloads (including one or more mitigation payloads), the addresses in range R not so far scanned, and the root system address (for reporting purposes).

The vulnerable computer system is also given the mitigation payload or payloads firstly for mitigating its own vulnerability, and for onward transmission to other computer systems (step 602). Having received this data, the computer system of address A scans all other addresses A in the range R by applying the second exploit program. In this way, the copy scanner exploits all remaining vulnerable systems (providing they have not already been mitigated) and identifies them by generating identification reports (steps 604 and 606). The mitigation payload is delivered to each exploited system (step 608) and responses (confirming vulnerability mitigation or otherwise) are stored (steps 608 and 610). Reports generated in step 606 contain such responses and, periodically, reports are sent to the root system (step 612).

It should be noted that the link between steps 604 and 606 may be omitted. In other words, it may not be necessary to report to the root system the identity of computer systems not containing the known software vulnerability. It will be understood, in addition, that the exploit program used by the copy scanner may be capable of identifying a number of different software vulnerabilities and respective payloads may be delivered to the exploited systems in step 608, generally in a sequential manner.

It should also be noted that the copy scanner may scan addresses within the range R (generally the remainder of range R not previously scanned by the root scanner) sequentially or concurrently.

As for the reports sent to the root system, these constitute the responses obtained from the IP addresses to which a payload has been delivered, as well as a report of addresses checked and the results for each address. An advantage of sending such reports periodically is that the root scanner can generate an alert if a report is not received when expected. Such an alert normally indicates that the copy scanner has not operated correctly and alternative measures may be taken to detect and identify remaining computer systems within the range R having a software vulnerability.

Having first described the operation of the copy scanner, reference is once again made to the root scanner flow chart of FIG. 16.

Having sent the copy scanner an associated payload and parameters to an exploited computer system in step 514, the root scanner then waits for a response from the copy scanner (700). If no response is received within a predetermined timeout period (702), it is assumed that the copy scanner is not operating and the next remaining address in range R is scanned by the root scanner by setting A to the next unscanned address (510), whereupon steps 506, 508, 514, 700, 702 and 510 are repeated so long as the copy scanner fails to respond within the predetermined time period, until all of the address in R have been scanned (512).

Alternatively, if a response is received from the copy scanner, the latest scan result from the copy scanner operating on the computer system having address A is recorded (704) and the root scanner continues to wait until the copy scanner at A has scanned all remaining addresses in range R (step 706 and loop-back link 708).

Again, it should be noted that, as described in connection with the copy scanner above, the root scanner may send a number of payloads to a vulnerable computer system, designed to deal with different respective vulnerabilities and/or to generate identification and other reports for transmission back to the root system.

The root scanner may also operate in concurrent or multiplexed mode to scan more than one address range R at a time so that, for instance, a plurality of root scanner instances are running simultaneously, each scanning a respective address range R at a given time.

The address ranges R may be regarded as subsets of a complete set of addresses, being a set of addresses relating to the whole or part of the network 1.

Another feature of the root scanner illustrated by the flow chart of FIG. 16 is that a vulnerable computer system at address A, detected in step 508 and caused to operate the copy scanner in step 514 may be used to scan not only addresses in a first range R, but also addresses in another address range R' if the network topology is such that use of the copy scanner for the second address range R' can perform scanning of the computer systems within that second address range more efficiently than the root scanner. Thus, when the root scanner has dealt with the range R' picked in step 502, as determined by step 706, the root scanner may determine whether there is an address range of a neighbouring group of computer systems which meets the efficiency criteria referred to immediately above so as to cause the copy scanner operating at address A to scan addresses in a second address range R' topologically close to the system at A (step 710).

If no such second range R' is identified, the root scanner reverts immediately to step 502 to pick a new range R for its own scanning process.

Use of the copy scanner to scan within an address range different from the system in which it has been deposited can be adopted as a general scanning practice, inasmuch as the root scanner may be used to scan only systems which are topologically remote from each other for candidates for infection with a copy scanner. In other words, systems which are topologically close to each other may be more efficiently dealt with by limitation between address ranges using copy scanners. The necessary knowledge of network topology for determining how systems at different locations are scanned can be obtained from stored data containing the network address mapping to the network topology, or by real time interrogation of routing tables. Information from routing tables can, therefore, be used to determine the address ranges which are local and those that are remote to any particular address.

Very high efficiency can be achieved when the root scanner scans the address range of each topologically remote network until it finds a vulnerable system to infect with a copy scanner. The copy scanner is configured to scan the address range that is topologically local to it, whilst the root scanner resources are concentrated on other topologically remote address ranges.

The reports sent back to the root system by the copy scanners can be used to report progress of the copy scanners and, thereby, obtain further improvements in scanning efficiency. Such a practice allows the root system to determine when a copy scanner has completed its work and to detect when a copy scanner is disabled before it had completed its assigned scanning process. The latter may happen due to detection of the exploit programs by a security monitoring process or as a result of scheduled or unscheduled system downtime, or by removal of a portable system from the network, and so on. When root system detects disabling of a copy scanner, it can continue the scan of the copy scanner's assigned address range, as described above with reference to FIG. 16, until it finds a new vulnerable system into which it can inject a new copy scanner to continue the scanning of that remote topologically location.

The efficiency of the root scanner can be improved, as already described above, using information relating to the topology of the network being scanned. Such efficiency improvements can include skipping ahead to the address range of the next remote location as soon as the system in one remote location has been "infected" with the copy scanner.

Such an embodiment will now be described with reference to the flow chart of FIGS. 18A and 18B. In this method, the scanning system has a root scanner which operates sequentially. The root scanner scans an address range until it finds a so-called "vulnerable" machine which has not yet been infected with a copy scanner. It then deposits a copy scanner and moves on to the next address range, and so on, coming back to previous address ranges to check that previously deposited copy scanners have not timed out, and resuming scanning a previous range if necessary. To do this, the root scanner maintains a list of address-range and active-copy-scanner-address pairs, checking the status of all elements in the list and starting a new address range if no elements on the list need servicing.

Figure 18A:
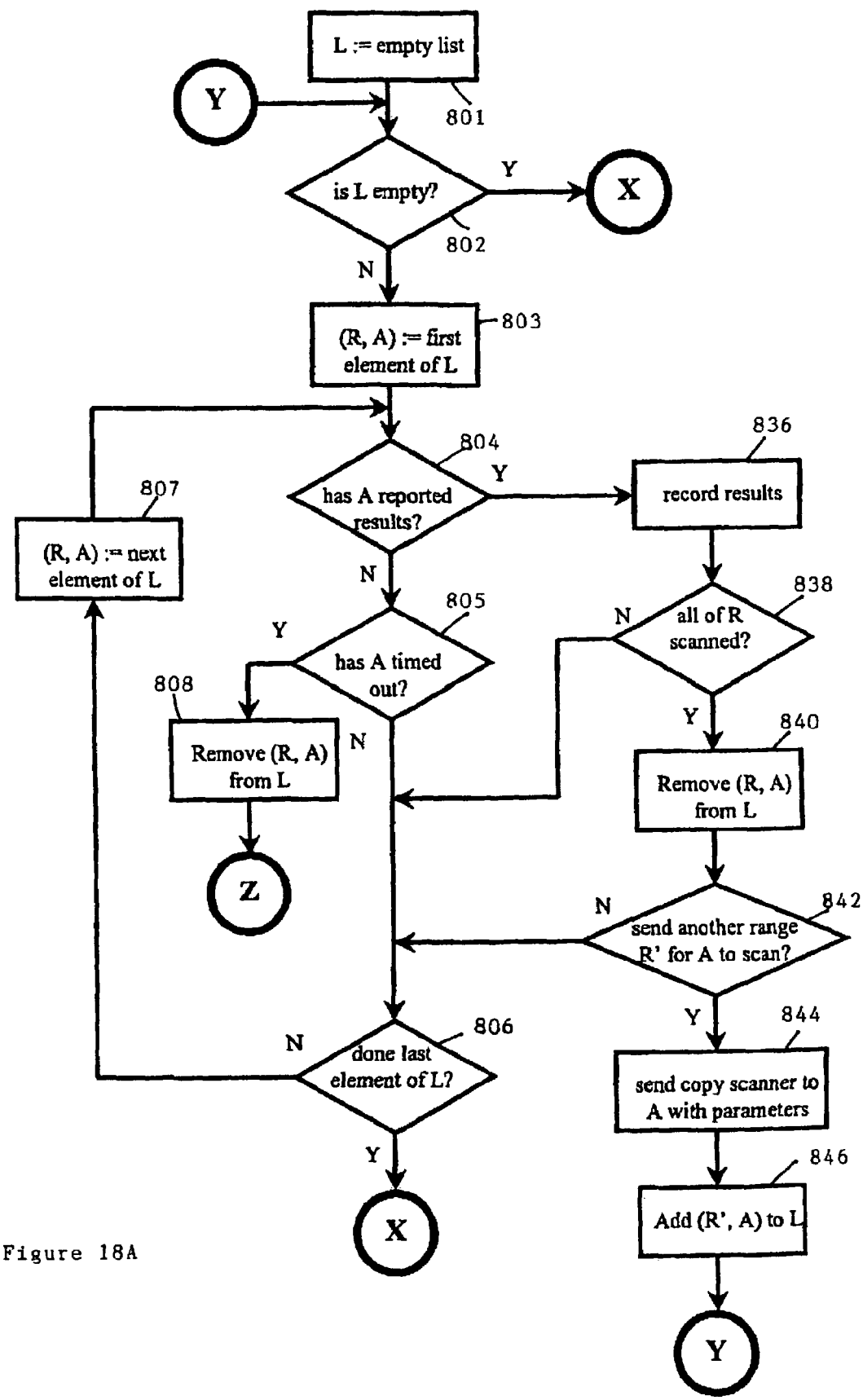
FIGS. 18A and 18B are a flow chart of an alternative root scanning process.
Figure 18B:
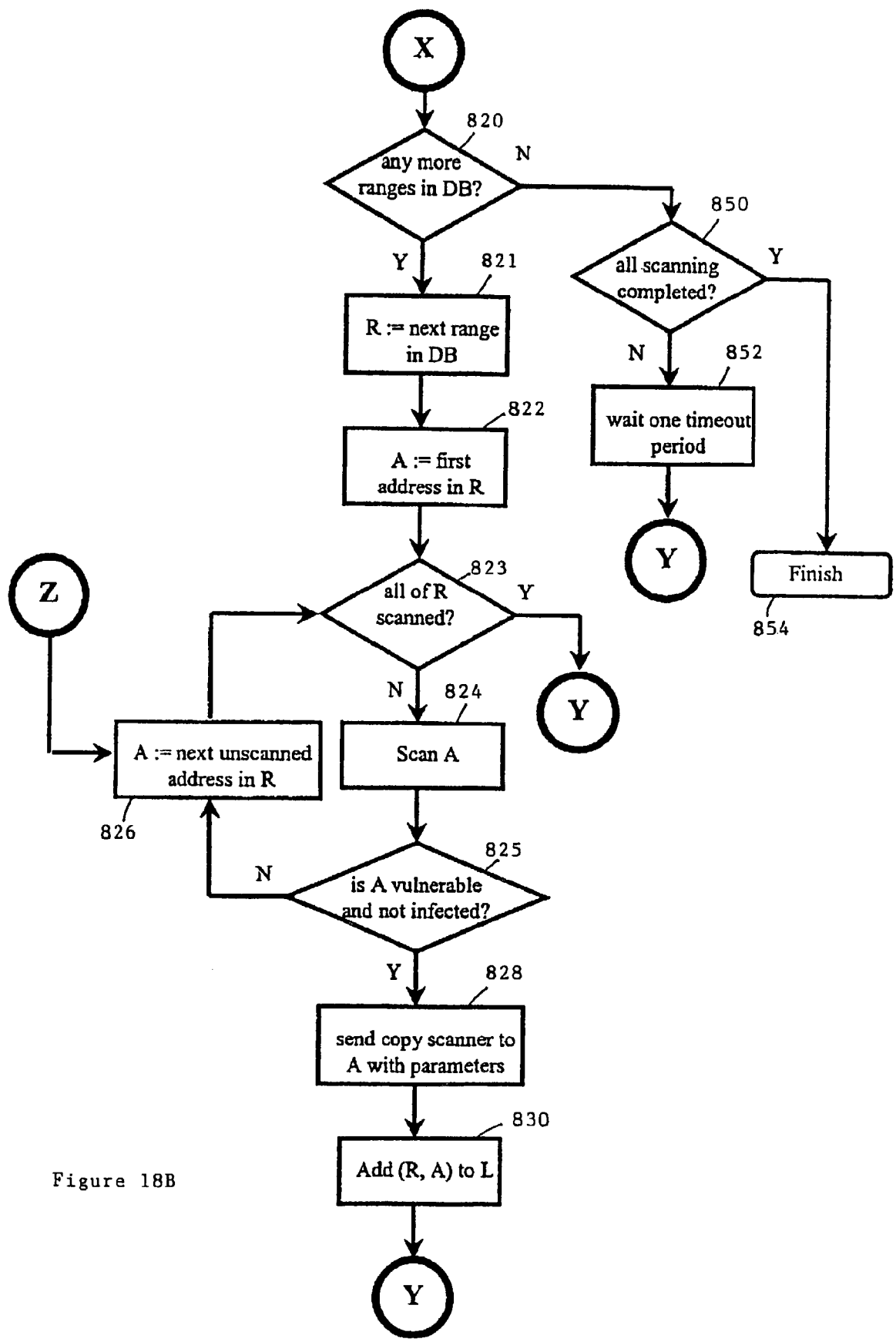

In FIGS. 18A and 18B, L means a list of pairs (R, A) of address ranges and addresses of machines currently running copy scanners. R is a range of addresses from a database (DB) of addresses of all computer systems in a network to be scanned. A is the address of a machine running the copy scanner. X, Y and Z are connection indicators showing where the paths of FIGS. 18A and 18B interconnect.

Maintenance and checking of the list L is performed mainly in steps 801 to 808. When starting with an empty list L (801), the answer to the first query diamond "is L empty" (802), on this occasion, must be "yes" and control passes to a routine which attempts to set up a copy scanner, as will be described below with reference to FIG. 18B. However, in the general case, the answer to query 802 is "no" and a first address pair (R, A) is selected (803). The root scanner then looks for a report from the copy scanner at A (804) and, in the absence of a report it checks whether the copy scanner at A has failed to report within a predetermined time-out period (805). If not, having checked that there are still elements in L to check (806), a new address range and copy scanner address pair is selected from the list (807) and steps 804 to 806 are repeated. If, however, copy scanner A has timed out without reporting, the relevant range/address pair is removed from list L (808) and the root scanner takes over scanning of addresses in range R itself (as will be described below).

As in the previously described embodiment, the root scanner is operated to scan address ranges for vulnerable and uninfected machines and, upon detecting one, a copy scanner is deposited. Once the first copy scanner is deposited, this process is performed only when the list L has been fully checked, which produces a "yes" answer to query box 806 in FIG. 18A. Control passes to box 820 in FIG. 18B where the root scanner looks for a range R in the database DB which it has not yet scanned. On finding one, R is designated as that range (821) and A is designated as the first address in R (822). At this stage, the answer to query block 823 (has all of R been scanned by the root scanner?) is "no" and the root scanner then enters a scanning loop represented by steps 824, 825 and 826 which are equivalent to steps 506, 508 and 510 of the previous embodiment (see FIG. 16). As in the previous embodiment, when a vulnerable and non-infected computer system is found in step 825, a copy scanner is deposited at A in step 828 (which is equivalent to step 514 in FIG. 16). Having done this, the root scanner then adds the range/address pair relating to this copy scanner to list L (830), whereupon the root scanner returns to the list-checking routine described above with reference to FIG. 18A (steps 802 to 808). It will be appreciated that this means that, once a copy scanner has been deposited at an address in range R, the root scanner, having completed its checking of all elements of list L again, goes back to step 820 (FIG. 18B) to choose a new range R without waiting for the copy scanner it has just deposited to finish.

When a copy scanner A does produce a report, which it typically does periodically, this is picked up by step 804 (FIG. 18A) in the list checking routine, and the reported results are recorded (836). If the report indicates that only part of the address range R has been scanned, the root scanner reverts to checking list L (838). If, however, all of R has been scanned, the relevant range/address pair is removed from list L (840) and a check is made to see whether there is another topologically local address range R' which the copy scanner at A can conveniently scan (842). (This query box 842 is equivalent to the query 710 in FIG. 16.) If such a range R' is found, a copy scanner is sent to the machine at A with the mitigation payload and parameters (844), range/address pair (R', A) is added to list L (846), and the root scanner returns to checking its other range/address pairs in L, starting at step 802. If no suitable topologically local range R' is found in step 842, list monitoring commences again from step 807.

The root scanner carries on in the above-described manner until it has attempted to deposit a copy scanner in all of the address ranges in the database DB (820). If, according to its monitoring of its own operation and on the basis of reports from the copy scanners, the root scanner establishes that there are still unscanned addresses in any range R (850), it waits one timeout period (852) to allow time for the copy scanners to produce a report and goes through another list checking exercise, starting at step 802. If, when it next reaches step 820, it finds that all addresses A have been scanned (850) the scanning of computer systems in the whole of the network recorded in database DB is regarded as having been completed (854).

Another alternative root scanner method will now be described. It is shown in pseudo code form below.

```
Repeat until all ranges in DB have been completely scanned
  For each range R in DB
    If R has not been completely scanned
      If we have an active copy scanner in R (on A)
        If the copy scanner has reported some results
          Record these results
          Reset timer for this copy scanner to 0
            (i.e. record current time)
          If R has been completely scanned
            Record that R has been completely
              scanned
            Comment: Now see if we can use A
              to scan another range R'
            If there is another range R' which has not
              been completely scanned and which has
              no active copy scanner and which is
              topologically close to A
                Send copy scanner and payload to
                  A with parameters
                Record that we have a copy
                  scanner in R' on A
                Start timer for A's copy scanner
                  (i.e. record the current time)
            endif
          endif
        else
          If this copy scanner has timed out (i.e. current
            time minus recorded time > timeout threshold)
            Record that we do not have a copy scanner
              in R (any more)
          endif
        endif
      endif
      If we do not have an active copy scanner in R
        A: = next unscanned address in R
        Scan A
        Record scan results for A
        If R has been completely scanned
          Record that we have scanned all of R
        else
          If A is vulnerable and not infected
            Send copy scanner and payload to A with
              parameters
            Record that we have a copy scanner in R
              on A
            Start timer for A's copy scanner (i.e.
              record the current time)
          endif
        endif
      endif
    endif
  endfor
endrepeat
```

This method uses a "breadth-first" approach, in which the root scanner scans one address A from each range R in the database DB in turn, then goes back and scans a second address from each range, and so on, handing scanning off to a copy scanner on any range where it finds a vulnerable and non-infected machine. It does not have a loop, as described above with reference to steps 823 to 826 in FIGS. 18A and 18B, in which the root scanner can scan a series of addresses A in range R sequentially until it finds a vulnerable, non-infected machine before reverting to checking other ranges in the range/address list.

The operation of this method will not be described in detail any further, since the pseudo code table above will be readily understood by persons skilled in the art of computer programming. Briefly, however, it will be seen that there is a "For" loop which is repeatedly executed for checking the ranges R. Within each looping operation, there are a number of "if" queries which give rise to various operations, as follows:

(a) Referring to the second "if" query, in the absence of an active copy scanner in a range R, control transfers to the "if" query "If we do not have an active copy scanner in R", whereupon the root scanner scans one address A in R, records the result, and if A is a vulnerable and not-infected machine, it deposits a copy scanner and records that deposit in a list, and starts a timer for that copy scanner. Control then passes back to the "For" statement. Similarly, if A is not vulnerable or already infected, the For loop is immediately restarted.

(b) If, on the other hand, there is an active copy scanner in R, then, referring to the third "if" query, if there are no results from that copy scanner, a check is performed to see whether the copy scanner has timed out (as in steps 805 and 807 in FIG. 18A). Since there is now no longer an active copy scanner in R, the answer to the next "if" query "if we do not have an active copy scanner in R" is affirmative which means that the root scanner, as in (a) above, scans one address A in R, records the result and, if A is a vulnerable and not infected machine, it deposits a new copy scanner, records that deposit in the list, and starts a timer for that copy scanner. The For loop is then restarted. As before, if A is not vulnerable or already infected, the For loop is immediately restarted.

(c) Referring again to the third "if" query, if there is a copy scanner and that copy scanner has reported some results, these results are recorded. If all of the addresses in R have been scanned, the root scanner looks for another range R' which has not been completely scanned, which has no active copy scanner and which is topologically close to A. In other words, if a copy scanner has reported some results, the system follows steps 836 and 838, and, optionally, steps 840, 842, 844 and 846, all appearing in FIG. 18A. Having completed those steps, the system again reverts to the beginning of the For loop.

The above processes continue until all the ranges in the database DB have been completely scanned.

Although, in the above description, the detection and mitigation of vulnerable systems is performed at two levels, i.e. by a root scanner at one level, and copy scanners at a second level, it is possible to envisage a system having three or more levels, providing the scanners operating at the lowest level do not themselves cause systems in which they detect a vulnerability to scan for vulnerabilities in other systems. In other words, at the lowest scanning level, only a mitigation, identification, or report payload is transmitted to vulnerable systems, whereby no further propagation of scanners or payloads occurs.

What is claimed is:

1. A method of identifying software vulnerabilities in a computer network comprising a set of computer systems having software stored thereon, a scanning system, and a management system, wherein the method comprises:

operating the scanning system to apply to at least one computer system of at least a subset of the computer systems a first interrogation program arranged to exploit a known software vulnerability;

in the event that the known vulnerability is exploited, operating the first interrogation program to cause the computer system on which the known software vulnerability was exploited to apply to a plurality of said computer systems in said subset a second interrogation program arranged to exploit the known software vulnerability;

in the event that the known vulnerability is exploited by the second interrogation program, operating the second interrogation program to generate management information at the computer system on which the known vulnerability was exploited by the second interrogation program, the management information at least identifying the respective computer system at which the known vulnerability was exploited; and sending the generated management information to the management system.

2. A method according to claim 1, wherein the second interrogation program is configured to avoid of causing the computer system on which the known software vulnerability was exploited to apply to other computer systems in said set an interrogation program capable of exploiting said known software vulnerability.

3. A method according to claim 2, wherein the scanning system is operated as a single root scanning system in respect of said set of computer systems.

4. A method according to claim 1, wherein the first interrogation program is operated to cause the computer system on which the known software vulnerability was exploited by the first interrogation program to generate management information, which management information is then sent to the management system.

5. A method according to claim 1, wherein at least the second of said interrogation programs is arranged so as to remediate the known software vulnerability it is arranged to exploit, and wherein, in the event that the interrogation program exploits a software vulnerability, the method further comprises operating that interrogation program to remediate said software vulnerability.

6. A method according to claim 1, wherein the set of computer systems comprises a plurality of subsets of computer systems, and wherein:

(a) the scanning system is operated to apply the first interrogation program to the computer systems of one of said subsets;

(b) when said vulnerability is exploited in a computer system of said one subset:

the first interrogation program is operated on the computer system which was exploited by the first interrogation program to apply the second interrogation program to other computer systems of said one subset whereby, in the event that the vulnerability is exploited by the second interrogation program in a computer system of the first subset, the steps of generating and sending management information are performed on each computer system so exploited, and operation of the scanning system in respect of said one subset is terminated;

(c) steps (a) and (b) are performed in respect of others of said subsets, whereby whilst the second interrogation program is being applied to computer systems within each subset in which the vulnerability has been exploited by the first interrogation program, the scanning system applies the first interrogation program to the computer systems of subsets to which it has not hitherto been applied.

7. A method according to claim 6, wherein the subsets of computer systems are topologically remote from each other.

8. A method according to claim 6, wherein the scanning system is operated to apply the first interrogation program to the computer systems of a plurality of said subsets concurrently.

9. A method according to claim 6, wherein the scanning systems is operated to apply the first interrogation program to the computer systems of a plurality of said subsets sequentially.

10. A method of detecting a software vulnerability in computer systems contained in a computer network, each computer system having a respective address within the network, wherein the method comprises:
running on a root system connected to the network a root scanning program which applies to a plurality of said computer systems that have addresses within a predefined address range a first interrogation program configured to detect a known software vulnerability;
in the event that said vulnerability is detected, running the first interrogation program to cause the computer system in which the vulnerability was detected to scan computer systems that have addresses within at least a subset of said predefined address range by applying to those computer systems a second interrogation program configured to detect said vulnerability; and
in the event that said vulnerability is detected by the second interrogation program, running the second interrogation program to cause the computer system in which it detected said vulnerability to run a mitigation program mitigating said vulnerability.

11. A method according to claim 10, wherein the first interrogation program comprises a copy scanning program and a mitigation program, the method including the step of running the mitigation program on the computer system in which said vulnerability was detected by the first interrogation program to mitigate the vulnerability on that computer system, and wherein the second interrogation program comprises said mitigation program but omits said copy scanning program.

12. A method according to claim 10, wherein said first and second interrogation programs each include an identification payload, the method including running the identification payload on each computer system in which the vulnerability is detected by either of said first and second interrogation programs to generate management information identifying that computer system and to send the management information to the root system.

13. A method according to claim 10, wherein the first interrogation program includes a reporting payload which comprises program code operable on said computer system in which the vulnerability is exploited by the first interrogation program, the method including a reporting step in which the reporting payload program code operates in conjunction with the scanning step of said computer system to generate report information relating to progress of the scanning step and to send said report information back to the root system.

14. A method according to claim 13, wherein the report information contains an indication of at least one of: completion of the scanning step, corresponding to completion of scanning of all of a plurality of computer systems having addresses in said subset of the predefined address range; and disabling of the scanning step before said completion.

15. A method according to claim 14, wherein the root system, in response to receipt of said report information indicating disabling of the scanning step before completion, itself completes scanning of the computer systems of the addresses in said subset to detect said vulnerability.

16. A method according to claim 10, wherein, in the event that said vulnerability is detected by said application of the first interrogation program, the computer system in which the vulnerability was detected is caused to generate at least one report indicative of the progress of the scanning step of that computer system and to send such a report to the root system.

17. A method according to claim 16, where, in the event that said vulnerability is detected by said application of the first interrogation program, the computer system in which the vulnerability was detected is caused to generate reports periodically and to send such reports periodically to the root system, and wherein the root system checks for receipt of such periodic reports and, in the event of a report not being received, generates an alert.

18. A computer program stored on a computer usable medium, the computer program comprising computer-readable instructions arranged to operate under the control of processing means to identify a software vulnerability in a computer network to which the processing means are connected, the computer network comprising a set of computer systems having software stored thereon, the computer program performing the following steps:
a scanning step comprising sending to at least one computer system of at least a subset of the computer systems a first interrogation program arranged to exploit a known software vulnerability;
in the event that the known vulnerability is exploited, causing the first interrogation program to operate to cause the computer system on which the known software vulnerability was exploited to apply to a plurality of said computer systems in said subset a second interrogation program arranged to exploit the known software vulnerability;
the first and second interrogation programs being such that, in the event that the known vulnerability is exploited by the second interrogation program, the second interrogation program is operated to generate management information at the computer system on which the known vulnerability was exploited by the second interrogation program, the management information at least identifying the respective computer system at which the known vulnerability was exploited; and
receiving the generated management information.

19. A computer program stored on a computer usable medium, the computer program comprising computer-readable instructions arranged to operate under the control of processing means to identify a software vulnerability in computer systems contained in a computer network, each computer system having a respective address within the network, the processing means forming part of a root system connected to the network, wherein the computer program performs the step of:

running on the root system connected to the network a root scanning program which applies to a plurality of said computer systems that have addresses within a predefined address range a first interrogation program configured to detect a known software vulnerability; and in the event that said vulnerability is detected, causing the first interrogation program to operate so as to cause the computer system in which the vulnerability was detected to scan computer systems that have addresses within at least a subset of said predefined address range by applying to those computer systems a second interrogation program configured to detect said vulnerability, the first and second interrogation programs being such that, in the event that said vulnerability is detected by the second interrogation program, the second interrogation program is operated to cause the computer system in which it detected said vulnerability to run a mitigation program mitigating said vulnerability.

20. A method of investigating vulnerabilities in a network of computers comprising:

using a first computer to scan other computers in the network;

detecting a vulnerability in a second computer; and using the second computer to scan further computers which lie in a predefined range of network addresses.

21. A method according to claim 20 further comprising the step of:

after detecting the vulnerability on the second computer and prior to scanning the further computers, using the first computer to install a program on the second computer to enable scanning of the further computers.

22. A method according to claim 20 wherein the predefined range of addresses of the further computers are addresses which lie within a subnet occupied by the second computer.

23. A method according to claim 20 wherein addresses in the network define a hierarchy and the subnet is lower down the hierarchy than an address assigned to the first computer.

* * * * *

UNITED STATES PATENT AND TRADEMARK OFFICE
CERTIFICATE OF CORRECTION

| | |
|---|---|
| PATENT NO. | : 7,353,539 B2 |
| APPLICATION NO. | : 10/345701 |
| DATED | : April 1, 2008 |
| INVENTOR(S) | : John Melvin Brawn et al. |

Page 1 of 1

It is certified that error appears in the above-identified patent and that said Letters Patent is hereby corrected as shown below:

Title Pg, Item (56), under "U.S. Patent Documents", in column 1,
line 5, delete "6,998,208 B2    2/2006           Kiguchi" and
insert -- 6,988,208  1/2006     Hrabik et al. --, therefor.

Signed and Sealed this

Sixteenth Day of December, 2008

JON W. DUDAS
*Director of the United States Patent and Trademark Office*